US008397929B2

(12) United States Patent
Choi

(10) Patent No.: US 8,397,929 B2
(45) Date of Patent: Mar. 19, 2013

(54) INTEGRAL BUFFERING APPARATUS FOR AUTOMATICALLY CONTROLLING FLOW RATE OF FLUID AND FLAT RACK CONTAINER INCLUDING THE INTEGRAL BUFFERING APPARATUS

(75) Inventor: Du-Min Choi, Suwon (KR)

(73) Assignee: Vanplus Co., Ltd., Seoul (KR)

( * ) Notice: Subject to any disclaimer, the term of this patent is extended or adjusted under 35 U.S.C. 154(b) by 251 days.

(21) Appl. No.: 12/868,746

(22) Filed: Aug. 26, 2010

(65) Prior Publication Data
US 2012/0048846 A1 Mar. 1, 2012

(51) Int. Cl.
*B65D 6/18* (2006.01)
(52) U.S. Cl. ........... 220/1.5; 220/6; 108/57.12; 188/281
(58) Field of Classification Search .................. 188/281, 188/282.1, 282.5, 282.6, 322.22; 220/1.5, 220/6; 108/57.12; 248/638
See application file for complete search history.

(56) References Cited

U.S. PATENT DOCUMENTS

| 1,198,829 | A | * | 9/1916 | Edwards | 188/316 |
| 1,616,091 | A | * | 2/1927 | Scott | 188/282.1 |
| 3,499,398 | A | * | 3/1970 | Murray | 108/53.5 |
| 4,964,349 | A | * | 10/1990 | Bishop | 108/55.1 |
| 6,116,388 | A | * | 9/2000 | Bataille et al. | 188/282.6 |
| 2010/0123276 | A1 | * | 5/2010 | Adoline | 267/69 |

* cited by examiner

*Primary Examiner* — Stephen Castellano
(74) *Attorney, Agent, or Firm* — Ladas & Parry LLP

(57) ABSTRACT

The present invention relates to a flat rack container, and more particularly, to an integral buffering apparatus disposed between end walls and a base and for automatically controlling a flow rate of oil that flows in a cylinder housing through channels formed in a slider when the end walls are folded, to control a falling speed of the end walls, thereby absorbing an impact of the end walls, preventing damage of the end walls and the base, and ensuring safety of workers. The integral buffering apparatus includes a cylinder housing including a space for accommodating oil; a slider disposed in the space to be movable in a length direction of the cylinder housing and to divide the space into a first space and a second space; first oil channels and a second oil channel for connecting the first space and the second space to each other.

6 Claims, 8 Drawing Sheets

INTEGRAL BUFFERING APPARATUS FOR AUTOMATICALLY CONTROLLING FLOW RATE OF FLUID AND FLAT RACK CONTAINER INCLUDING THE INTEGRAL BUFFERING APPARATUS

BACKGROUND OF THE INVENTION

1. Field of the Invention

The present invention relates to a flat rack container, and more particularly, to an integral buffering apparatus disposed between end walls and a base and for automatically controlling a flow rate of oil that flows in a cylinder housing through channels formed in a slider when the end walls are folded, to control a falling speed of the end walls, thereby absorbing an impact of the end walls, preventing damage of the end walls and the base, and ensuring safety of a worker.

2. Description of the Related Art

In general, containers are used to conveniently transfer goods and their sizes are standardized by the International Organization for Standardization (ISO), e.g., 20 feet, 40 feet, and 45 feet.

Examples of containers include dry containers, reefer containers, open top containers, and flat rack containers.

From among these, flat rack containers do not have ceilings and side walls and thus medium-sized goods such as cars or machines may be loaded or unloaded from both sides.

FIG. 1 is a perspective view of a conventional flat rack container 10.

As illustrated in FIG. 1, the conventional flat rack container 10 includes a base 11 on which goods are loaded, and an end wall 13 rotatably combined at each of two sides of the base 11.

The end wall 13 is combine with the base 11 by using a pivot (or hinge) 14, and may rotate about the pivot 14 to be folded or unfolded.

A counter balancing spring 15 for elastically supporting rotation of the end wall 13 is disposed under the end wall 13.

A first locker 16 for maintaining an unfolded state is disposed at one side of the end wall 13, and a second locker 17 for maintaining a folded state is disposed at another side of the end wall 13.

When the conventional flat rack container 10 is used, the end wall 13 is maintained in the unfolded state (a perpendicularly lifted state, represented by solid lines in FIG. 1) and the first locker 16 is locked to fix the position of the end wall 13.

On the other hand, when the conventional flat rack container 10 is not used or is being transported, the end wall 13 is maintained in the folded state (a horizontally laid state, represented by virtual lines) and the second locker 17 is locked to fix the position of the end wall 13.

In most cases, the end wall 13 is very heavy, e.g., about 400 to 450 kg. Accordingly, when the end wall 13 is folded, a resistive force has to be applied to the end wall 13 so as to slow rotation of the end wall 13 about the pivot 14. The counter balancing spring 15 applies such a resistive force to the end wall 13 to buffer an impact of the end wall 13 that the end wall 13 may fall on the base 11 slowly without an impact.

However, in the conventional flat rack container 10, the counter balancing spring 15 applies to the end wall 13 a force acting upward, and thus the end wall 13 may be lifted due to wind or an impact on the road while the conventional flat rack container 10 is being transported by a car and the end wall 13 may crash into a bridge pier or the like. In order solve this problem, the force acting upward to lift the end wall 13 is suppressed by using a spring having a tensile force that is not sufficient for counter balancing. However, in this case, a resistive force applied to the end wall 13 when the end wall 13 is folded is excessively weak. Accordingly, the end wall 13 applies a strong impact to the base 11 when the end wall 13 falls on the base 11 and thus the lifespan of the conventional flat rack container 10 is reduced. In addition, the impact may cause various safety accidents involving workers and thus safety of the workers is not ensured.

Currently, a technology using a powered hydraulic cylinder instead of a counter balancing spring is suggested. However, in this technology, electricity is supplied to drive a motor and power of the motor is used to operate the powered hydraulic cylinder. Accordingly, electrical equipment is additionally required, operation is inconvenient, and manufacturing costs of a flat rack container is increased.

SUMMARY OF THE INVENTION

The present invention provides an integral buffering apparatus for automatically controlling a flow rate of a fluid to control a falling speed of end walls, thereby absorbing an impact of the end walls, preventing damage of the end walls and a base, easily performing a folding operation, ensuring safety of a worker, and reducing a manufacturing cost, and a flat rack container including the integral buffering apparatus.

According to an aspect of the present invention, there is provided an integral buffering apparatus for automatically controlling a flow rate of a fluid, the integral buffering apparatus including a cylinder housing comprising a space for accommodating oil; a slider disposed in the space to be movable in a length direction of the cylinder housing and to divide the space into a first space and a second space; first oil channels and a second oil channel for connecting the first space and the second space to each other; a cylinder rod having one end disposed outside the cylinder housing and another end inserted into the space and combined with the slider; and a cylinder housing cap combined with the cylinder housing in order to seal the space of the cylinder housing, wherein, when the cylinder rod moves in one direction, the first oil channels are closed and the oil in the first space flows into the second space through the second oil channel, and wherein, when the cylinder rod moves in another direction, the first oil channels are open and the oil in the second space flows into the first space through the first oil channels and the second oil channel.

The integral buffering apparatus may further include a pressing plate disposed at the other end of the cylinder rod and for closing the first oil channels, the first oil channels and the second oil channel may be formed in the slider, and the slider may be combined with the cylinder rod to be movable on the cylinder rod between a closing position for closing the first oil channels by using the pressing plate and an opening position for opening the first oil channels.

The integral buffering apparatus may further include a stopper separated from the pressing plate by a predetermined distance, formed at the other end of the cylinder rod, and for restricting a moving distance of the slider on the cylinder rod.

The second oil channel may be disposed farther from a center of the slider in a radius direction in comparison to the first oil channels.

A diameter of the first oil channels may be greater than a diameter of the second oil channel.

The cylinder rod, the pressing plate, and the stopper may be integrally formed, the slider may be divided into two body pieces, and a combining recess and a combining protrusion may be respectively formed at two ends of each of the body pieces.

The integral buffering apparatus may further include a pressing plate disposed at the other end of the cylinder rod and for closing the first oil channels; and a bypass tube formed outside the cylinder housing to connect the first space and the second space to each other, and comprising the second oil channel, the first oil channels may be formed in the slider, and the slider may be combined with the cylinder rod to be movable on the cylinder rod between a closing position for closing the first oil channels by the pressing plate and an opening position for opening the first oil channels.

The integral buffering apparatus may further include a stopper separated from the pressing plate by a predetermined distance, formed at the other end of the cylinder rod, and for restricting a moving distance of the slider on the cylinder rod.

The bypass tube may be connected to a flow rate controlling valve.

The flow rate controlling valve may be exposed to an outer side of the base.

According to another aspect of the present invention, there is provided a flat rack container including a base for loading goods; an end wall rotatably combined at each of two ends of the base by using a pivot; and the above integral buffering apparatus, wherein, in the integral buffering apparatus, one of the cylinder rod and the cylinder housing is combined with the base and the other of the cylinder rod and the cylinder housing is combined with the end wall in such a way that the cylinder rod moves in one direction when the end wall is folded, and moves in another direction when the end wall is unfolded.

The flat rack container may further include a fixing bracket combined with the base; and a fixing arm fixed to the pivot of the end wall by using a pin, and one of the cylinder rod and the cylinder housing may be combined with the fixing bracket by using a hinge, and the other of the cylinder rod and the cylinder housing may be connected to the fixing arm.

When the end wall is completely unfolded, a center of gravity of the end wall may be at an outer side of a virtual line that extends perpendicularly from a center of rotation of the end wall and thus the end wall may be maintained in the unfolded state as long as an external force is not applied.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining embodiments of the invention with reference to the attached drawings.

Figure 1:
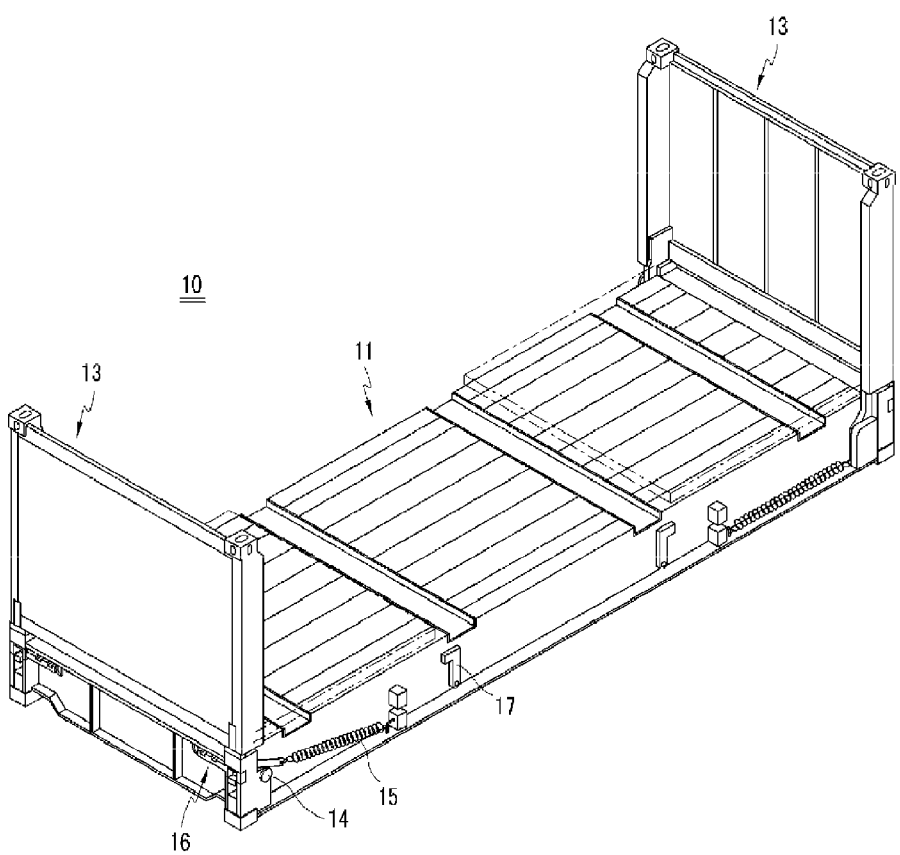
FIG. 1 is a perspective view of a conventional flat rack container.
Figure 2:
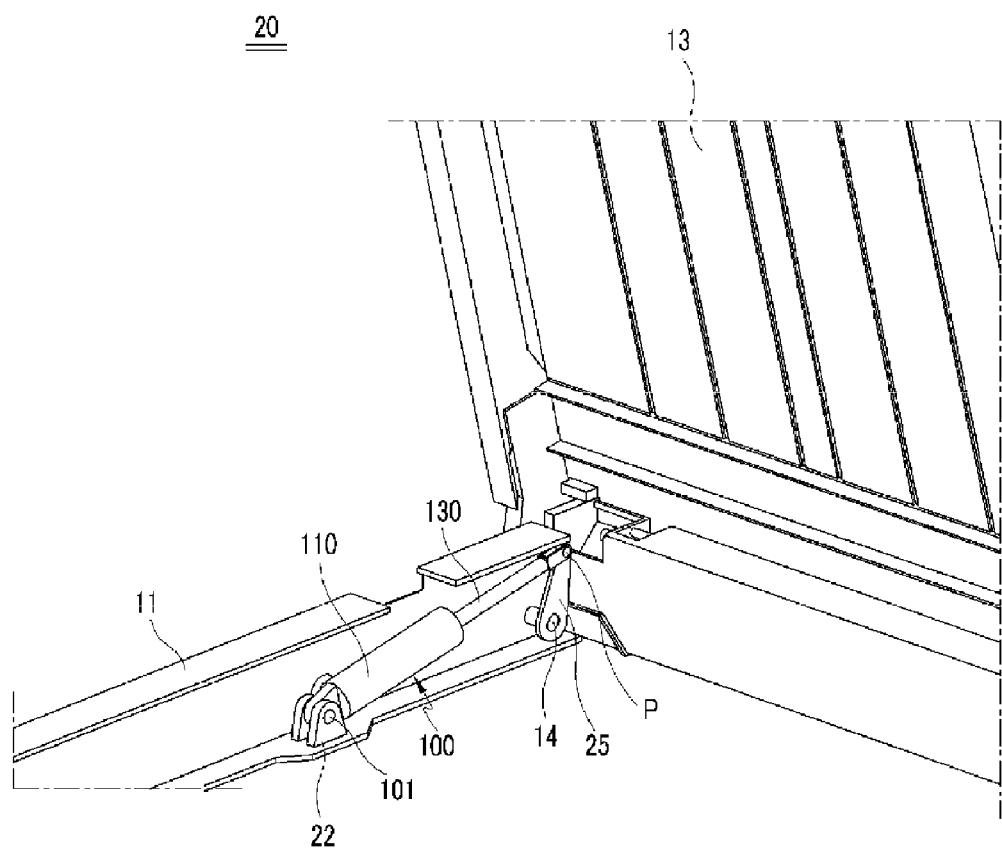
FIG. 2 is a perspective view of a flat rack container including an integral buffering apparatus for automatically controlling a flow rate of a fluid, according to an embodiment of the present invention.
Figure 3:
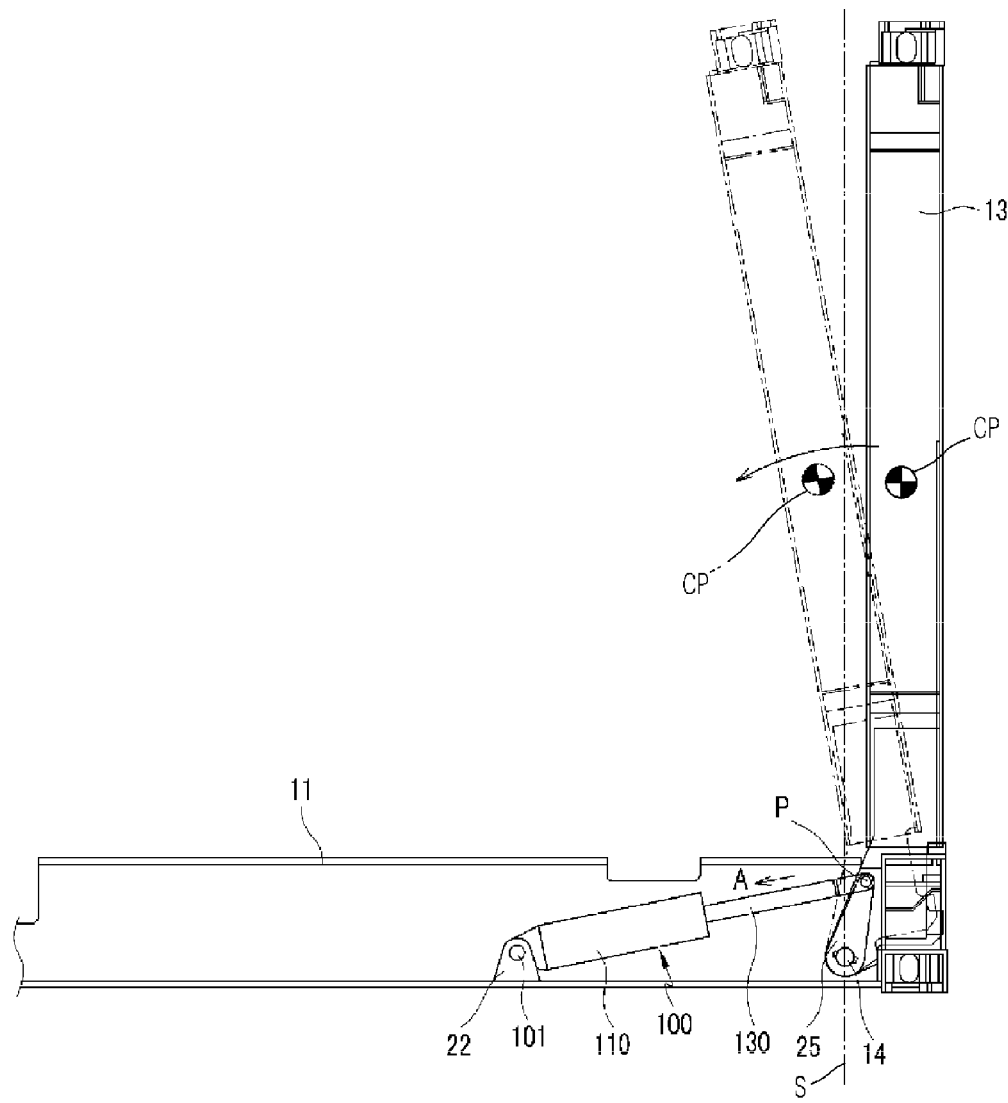
FIG. 3 is a front view for describing a folding operation of an end wall of the flat rack container illustrated in FIG. 2.
Figure 4:
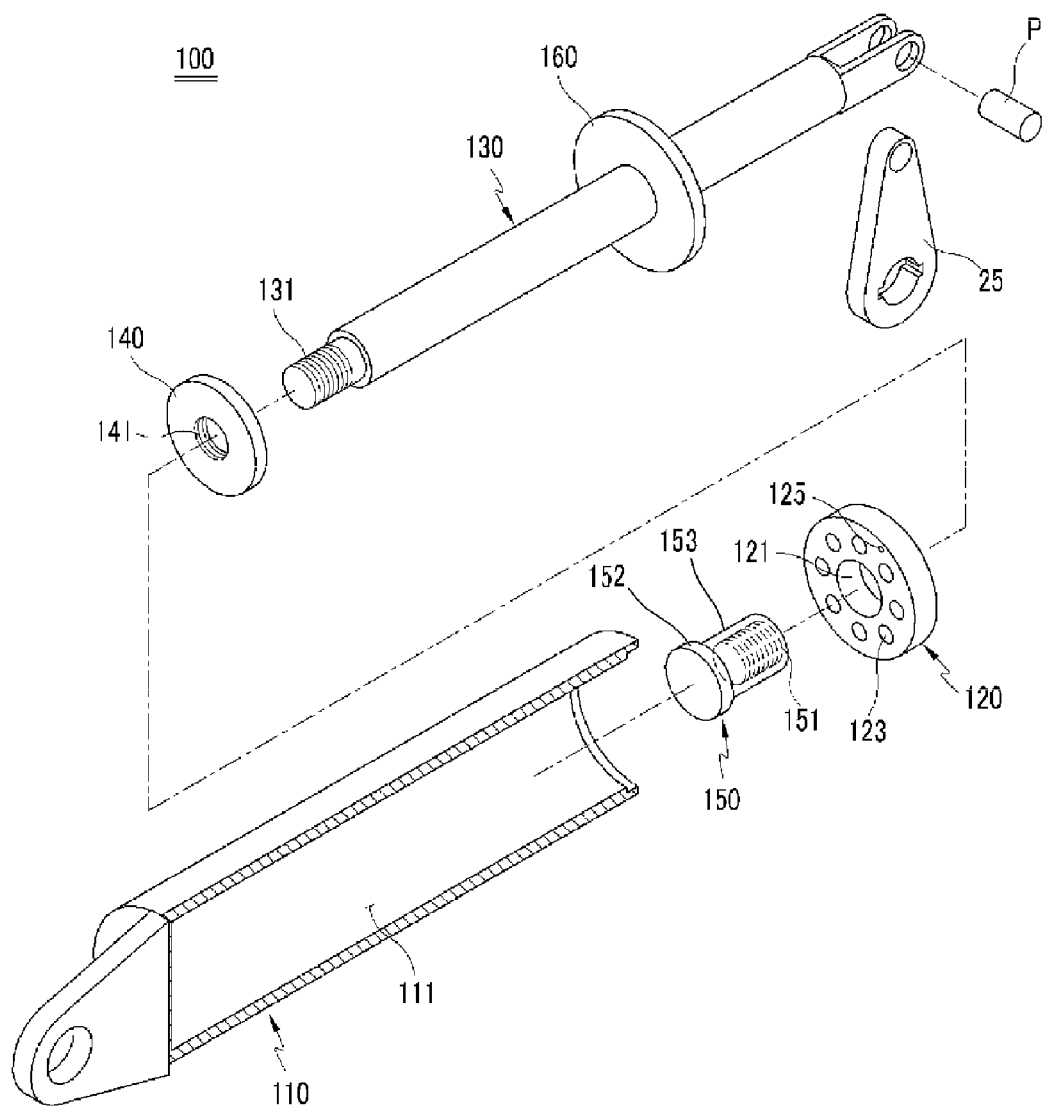
FIG. 4 is an exploded perspective view of the integral buffering apparatus illustrated in FIG. 2, according to an embodiment of the present invention.
Figure 5:
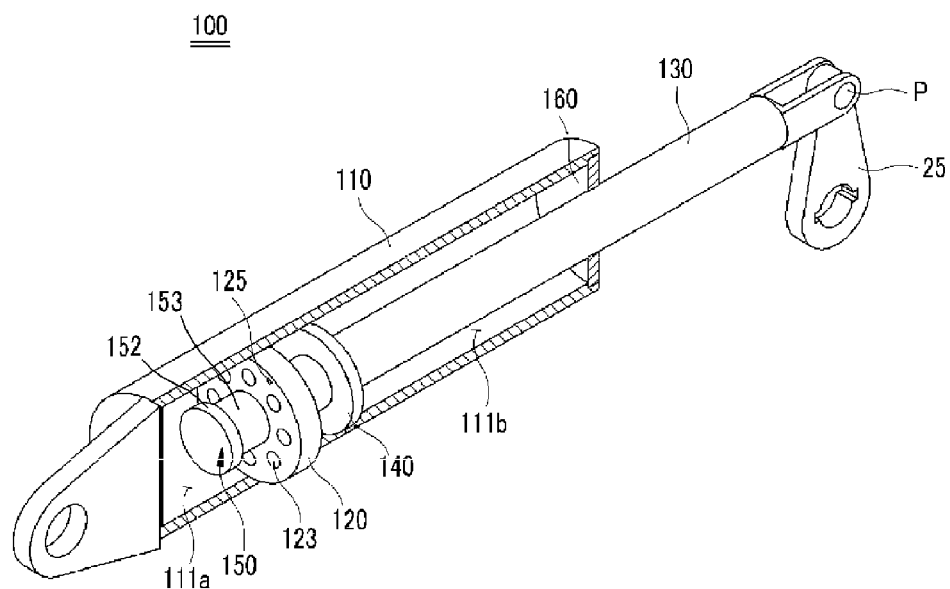
FIG. 5 is a combined perspective view of the integral buffering apparatus illustrated in FIG. 4.
Figure 6:
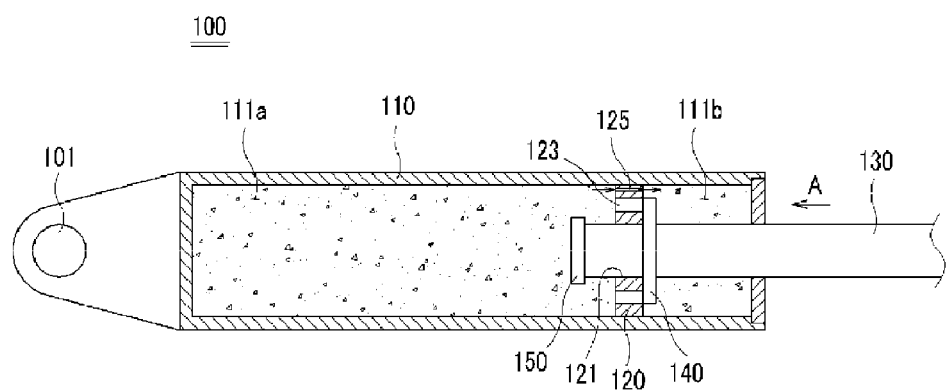
FIG. 6 is a cross-sectional view for describing a hydraulic operation of the integral buffering apparatus illustrated in FIG. 4 when the end wall illustrated in FIG. 2 is folded.
Figure 7:
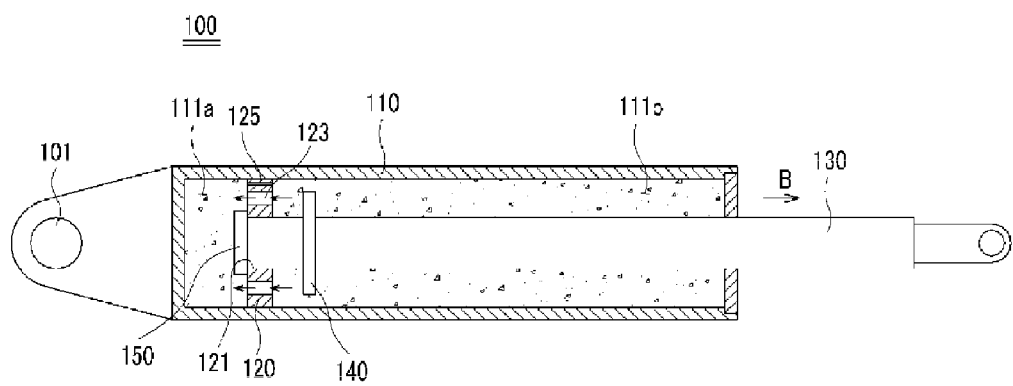
FIG. 7 is a cross-sectional view for describing the hydraulic operation of the integral buffering apparatus illustrated in FIG. 4 when the end wall illustrated in FIG. 2 is unfolded.

FIG. 2 is a perspective view of a flat rack container 20 including an integral buffering apparatus 100 for automatically controlling a flow rate of a fluid, according to an embodiment of the present invention. FIG. 3 is a front view for describing a folding operation of an end wall 13 of the flat rack container 20 illustrated in FIG. 2. FIG. 4 is an exploded perspective view of the integral buffering apparatus 100 illustrated in FIG. 2, according to an embodiment of the present invention. FIG. 5 is a combined perspective view of the integral buffering apparatus 100 illustrated in FIG. 4. FIG. 6 is a cross-sectional view for describing a hydraulic operation of the integral buffering apparatus 100 illustrated in FIG. 4 when the end wall 13 illustrated in FIG. 2 is folded. FIG. 7 is a cross-sectional view for describing the hydraulic operation of the integral buffering apparatus 100 illustrated in FIG. 4 when the end wall 13 illustrated in FIG. 2 is unfolded.

Referring to FIGS. 2 through 7, the flat rack container 20 includes a base 11 on which goods are loaded; the end wall 13 rotatably combined at each of two sides of the base 11 by using a pivot 14; a fixing bracket 22 combined at an inner side of the base 11; a fixing arm 25 fixed to the pivot 14 of the end wall 13 by using a pin P and disposed at the inner side of the base 11; and the integral buffering apparatus 100 disposed between the fixing bracket 22 of the base 11 and the fixing arm 25 of the end wall 13 to buffer an impact of the end wall 13 when the end wall 13 is folded.

As illustrated in FIG. 3, the flat rack container 20 is structured in such a way that, when the end wall 13 is completely unfolded, a center of gravity CP of the end wall 13 is at an outer side of a virtual line S that extends perpendicularly from the center of rotation of the end wall 13 and that, when the end wall 13 is completely folded, the center of gravity CP of the end wall 13 is at an inner side of the virtual line S. This structure may be realized by controlling relative positions of the pivot 14 and the center of gravity CP of the end wall 13.

The integral buffering apparatus 100 includes a cylinder housing 110 having one end combined with the fixing bracket 22 of the base 11 by using a hinge 101 and including a space 111 for accommodating oil; a slider 120 disposed in the space 111 to divide the space 111 into a first space 111a and a second space 111b, formed to be movable in a length direction of the cylinder housing 110, and including a combining hole 121 formed at the center of the slider 120, first oil channels 123 formed around the combining hole 121 along a circumference direction of the slider 120, and a second oil channel 125 formed outside the first oil channels 123 and having a diameter less than that of the first oil channels 123;

a cylinder rod 130 having one end disposed outside the cylinder housing 110 and connected to the fixing arm 25 of the pivot 14 of the end wall 13, and another end inserted into the space 111 and combined with the slider 120; a pressing plate 140 having a diameter that is sufficient to close the first oil channels 123 when the end wall 13 is folded; a stopper 150 formed at the other end of the cylinder rod 130 to penetrate through the combining hole 121 of the slider 120, and for restricting a moving distance of the slider 120 on the cylinder rod 130; and a cylinder housing cap 160 combined with an open end of the cylinder housing 110 in order to seal the space 111 of the cylinder housing 110.

The integral buffering apparatus 100 will now be described in detail.

The cylinder housing 110 has a cylindrical shape, and has a closed end and the open end. The closed end of the cylinder housing 110 is combined with the fixing bracket 22 of the base 11 by using the hinge 101. The open end of the cylinder housing 110 is used to insert the cylinder rod 130 into the space 111 for accommodating the oil.

The slider 120 is disposed in the space 111 to contact an inner circumference of the cylinder housing 110, and has a shape corresponding to the shape of the cylinder housing 110, e.g., a cylindrical shape.

The space 111 is divided into the first space 111a and the second space 111b by the slider 120. For convenience of explanation, with reference to the slider 120, a space in which the stopper 150 is disposed is defined as the first space 111a and a space in which the pressing plate 140 is disposed is defined as the second space 111b.

The slider 120 is movable in the length direction of the cylinder housing 110 according to the hydraulic operation. In more detail, the slider 120 is combined with the cylinder rod 130 to be movable on the cylinder rod 130 between a closing position for closing the first oil channels 123 by using the pressing plate 140 and an opening position for opening the first oil channels 123. In the slider 120, the combining hole 121 is formed at the center of the slider 120, the first oil channels 123 are formed around the combining hole 121 along the circumference direction of the slider 120, and the second oil channel 125 is formed outside the first oil channels 123.

The second oil channel 125 is disposed farther from the combining hole 121 in a radius direction of the slider 120 in comparison to the first oil channels 123.

The diameter of the first oil channels 123 may be greater than that of the second oil channel 125.

The cylinder rod 130 has one end connected to the fixing arm 25 of the pivot 14 of the end wall 13 by using the pin P, and another end inserted into the space 111.

The pressing plate 140 has a diameter that is sufficient to close the first oil channels 123 when the end wall 13 is folded. A male screw 131 of the cylinder rod 130 is combined with a female screw 141 of the pressing plate 140 so that the pressing plate 140 is fixed to an end of the cylinder rod 130.

The stopper 150 restricts the moving distance of the slider 120 on the cylinder rod 130, and includes a head 152, a body 153 extending from the head 152, and a female screw 151 formed at an end of the body 153.

The stopper 150 penetrates through the combining hole 121 of the slider 120 and is fixed to the end of the cylinder rod 130 as the female screw 151 is combined with the male screw 131 of the cylinder rod 130. In this case, the slider 120 is disposed on the body 153 of the stopper 150 before the stopper 150 is fixed to the end of the cylinder rod 130. Accordingly, the slider 120 is movable back and forth on the cylinder rod 130 between the pressing plate 140 and the head 152 of the stopper 150 while the slider 120 is disposed on the body 153 of the stopper 150.

The cylinder housing cap 160 may be combined with the open end of the cylinder housing 110 by using a typical combining means such as a bolt or a welding method in order to seal the space 111 of the cylinder housing 110.

In the integral buffering apparatus 100, when the end wall 13 is folded, i.e., when the cylinder rod 130 proceeds in a direction into the cylinder housing 110 (represented by an arrow A in FIG. 6), the slider 120 moves to the closing position and thus the first oil channels 123 are closed by the pressing plate 140. In this case, the oil in the first space 111a flows into the second space 111b through the second oil channel 125.

When the end wall 13 is unfolded, i.e., when the cylinder rod 130 proceeds in a direction out of the cylinder housing 110 (represented by an arrow B in FIG. 7), the slider 120 moves to the opening position and thus the first oil channels 123 are open. In this case, the oil in the second space 111b flows into the first space 111a through the first oil channels 123 and the second oil channel 125.

Operation of the integral buffering apparatus 100 will now be described.

The end wall 13 represented by solid lines in FIG. 3 is completely unfolded. When the end wall 13 is completely unfolded, the center of gravity CP of the end wall 13 is at the outer side of the virtual line S, which extends perpendicularly from the center of rotation of the end wall 13, i.e., the pivot 14, and thus the end wall 13 may be maintained in the unfolded state as long as an external force is not applied.

In order to fold the end wall 13, a worker pushes the end wall 13 to slightly rotate the end wall 13 about the pivot 14 in a counterclockwise direction. As represented by dashed dotted lines in FIG. 3, if the end wall 13 is rotated until the center of gravity CP is at the inner side of the virtual line S, the end wall 13 and the fixing arm 25 fixed to the pivot 14 move to a position capable of folding the end wall 13 due to a self-weight of the end wall 13. In this process, the slider 120 moves on the cylinder rod 130 from the closing position to the opening position, and thus a worker may easily push the end wall 13 without receiving a resistive force of hydraulic pressure applied to the slider 120.

After that, even if a worker does not further push the end wall 13 to rotate the end wall 13, the end wall 13 continues to rotate about the pivot 14 to be folded due to the self-weight of the end wall 13, and the fixing arm 25 fixed to the pivot 14 rotates about the pivot 14 in a counterclockwise direction. In this case, the cylinder rod 130 combined with the fixing arm 25 by using the pin P starts to be compressed in the direction into the cylinder housing 110 (represented by the arrow A in FIG. 6).

As illustrated in FIG. 6, if the cylinder rod 130 is compressed in the direction into the cylinder housing 110 (represented by the arrow A in FIG. 6), the pressing plate 140 closes the first oil channels 123 of the slider 120 within a predetermined period of time. Here, the cylinder rod 130 is continuously compressed into the cylinder housing 110 due to the rotation of the end wall 13, and thus the oil in the first space 111a does not pass through the first oil channels 123 and flows into the second space 111b through the second oil channel 125. In this case, since the oil in the first space 111a flows into the second space 111b through the second oil channel 125, which allows a relatively low flow rate in comparison to the first oil channels 123, the resistive force of hydraulic pressure occurs, the cylinder rod 130 moves slowly, and thus the end wall 13 falls slowly.

Due to the above-described hydraulic operation, when the end wall 13 is folded, as an impact of the end wall 13 is absorbed by controlling a falling speed of the end wall 13, damage of the base 11 and the end wall 13 may be prevented and a safety accident involving a worker when the end wall 13 falls rapidly may be effectively prevented in advance.

On the other hand, when the end wall 13 is unfolded, as illustrated in FIG. 3, the end wall 13 may be lifted to inversely rotate about the pivot 14 by using a forklift, which rotates the fixing arm 25 about the pivot 14 in a clockwise direction. In this case, the cylinder rod 130 combined with the fixing arm 25 by using the pin P is pulled in the direction out of the cylinder housing 110 (represented by the arrow B in FIG. 7).

As illustrated in FIG. 7, if the cylinder rod 130 is pulled in the direction out of the cylinder housing 110 (represented by the arrow B in FIG. 7), the slider 120 moves on the cylinder rod 130 from the closing position to the opening position, and thus the first oil channels 123 closed by the pressing plate 140 are open.

Here, the cylinder rod 130 is continuously pulled out of the cylinder housing 110 due to the rotation of the end wall 13, and thus the oil in the second space 111b passes through the first oil channels 123 and the second oil channel 125 and flows into the first space 111a. In this case, since the oil in the second space 111b flows into the first space 111a through the second oil channel 125 and the first oil channels 123, which allow a relatively high flow rate in comparison to using only the second oil channel 125, the cylinder rod 130 may easily proceed backward without receiving a large resistive force and thus a worker may easily lift and unfold the end wall 13.

As described above, the integral buffering apparatus 100 may not require an electrical motor to fold or unfold the end wall 13 and thus an overall manufacturing cost may be reduced.

Also, since electrical equipment such as the electrical motor is not included, the integral buffering apparatus 100 may be simply structured and easily operated. Furthermore, since the integral buffering apparatus 100 is disposed at the inner side of the base 11 unlike a conventional counter balancing spring, the integral buffering apparatus 100 may be effectively protected from an external impact.

Figure 8:
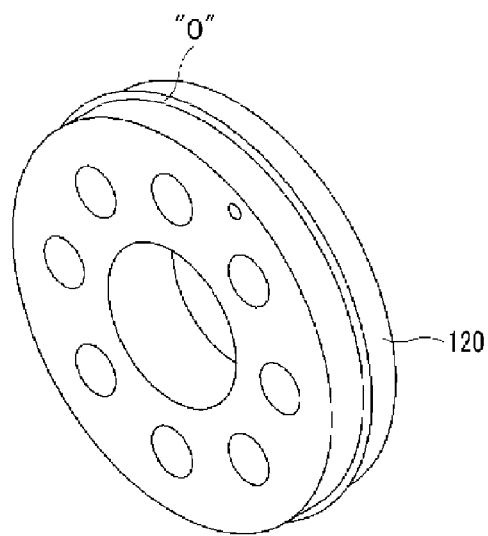
FIG. 8 is a perspective view of a modified example of a slider of the integral buffering apparatus illustrated in FIG. 4.

FIG. 8 is a perspective view of a modified example of the slider 120 of the integral buffering apparatus 100 illustrated in FIG. 4.

As illustrated in FIG. 8, an o-ring O may be disposed on an outer circumference of the slider 120. A contact portion between components is inevitably worn out due to operation for a long time. If the o-ring O is not disposed, the outer circumference of the slider 120 may be worn out and thus the slider 120 itself has to be replaced. However, if the o-ring O is disposed, instead of the slider 120, the o-ring O may be replaced by a new one and thus an economical advantage may be obtained.

Figure 9:
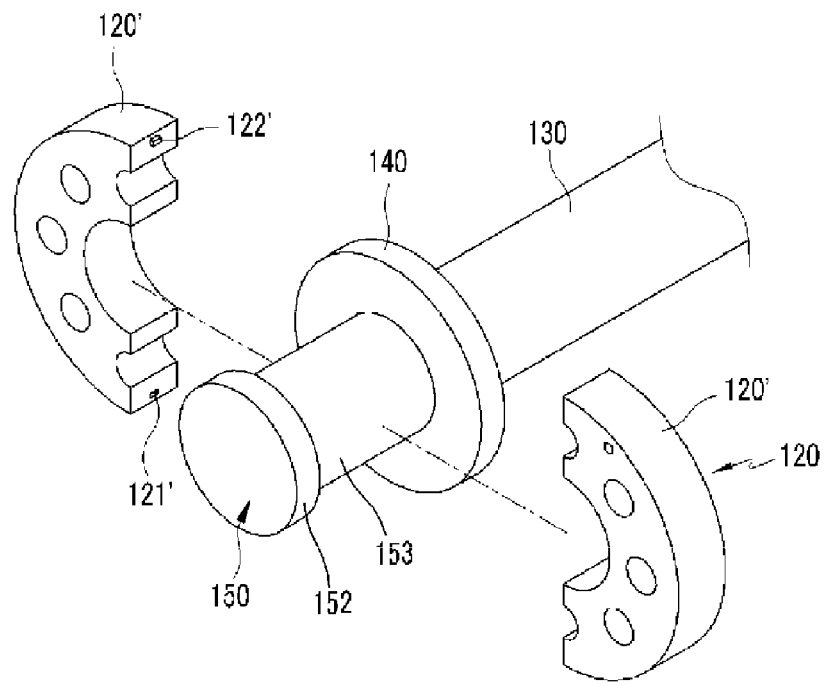
FIG. 9 is a perspective view of another modified example of the slider of the integral buffering apparatus illustrated in FIG. 4.

FIG. 9 is a perspective view of another modified example of the slider 120 of the integral buffering apparatus 100 illustrated in FIG. 4.

As illustrated in FIG. 9, the cylinder rod 130, the pressing plate 140, and the stopper 150 may be integrally formed. In this case, the slider 120 is divided into two body pieces 120', a combining recess 121' and a combining protrusion 122' are respectively formed at two ends of one body piece 120', and the combining protrusion 122' and the combining recess 121' are respectively formed at two ends of the other body piece 120'. The combining protrusions 122' are fitted into the combining recesses 121' to combine the two body pieces 120' with each other, and thus the slider 120 is assembled. If the cylinder rod 130, the pressing plate 140, and the stopper 150 are integrally formed, the structural strength thereof may be improved.

Figure 10:
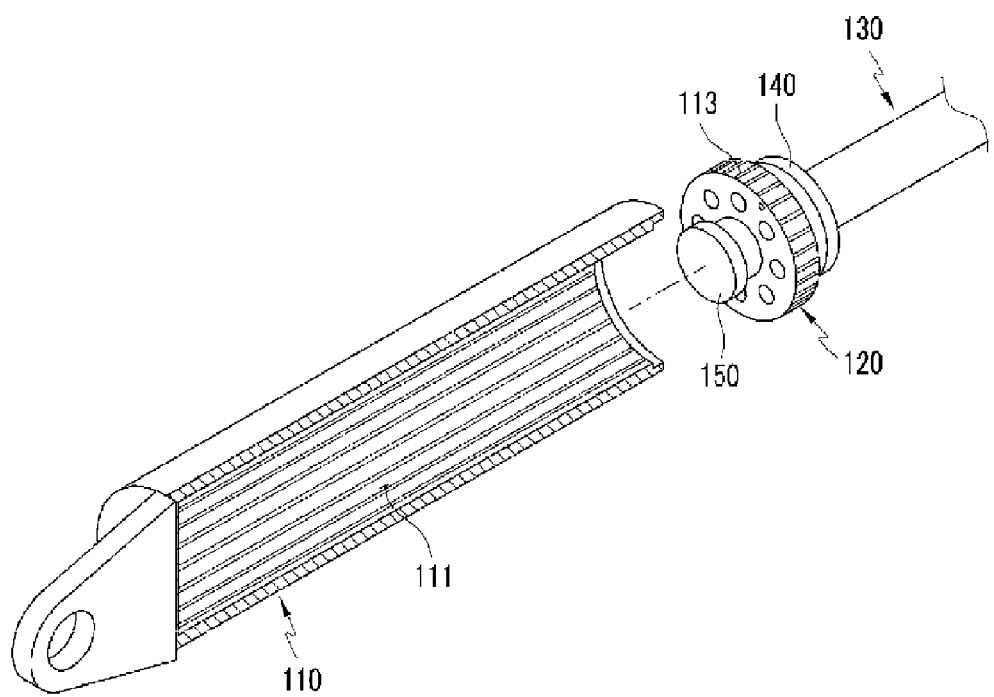
FIG. 10 is a perspective view of a modified example of a cylinder housing and the slider of the integral buffering apparatus illustrated in FIG. 4.

FIG. 10 is a perspective view of a modified example of the cylinder housing 110 and the slider 120 of the integral buffering apparatus 100 illustrated in FIG. 4.

As illustrated in FIG. 10, guide grooves 111 may be formed in the inner circumference of the cylinder housing 110 in the length direction of the cylinder housing 110, and guide protrusions 113 may be formed on the outer circumference of the slider 120 to correspond to the guide grooves 111. In this case, the slider 120 may slide more smoothly due to the guide grooves 111 and the guide protrusions 113.

Also, although not shown in FIG. 10, the guide grooves 111 and the guide protrusions 113 may be formed in a spiral shape. In this case, the slider 120 may move while rotating and thus the hydraulic operation may be performed more effectively.

Figure 11:
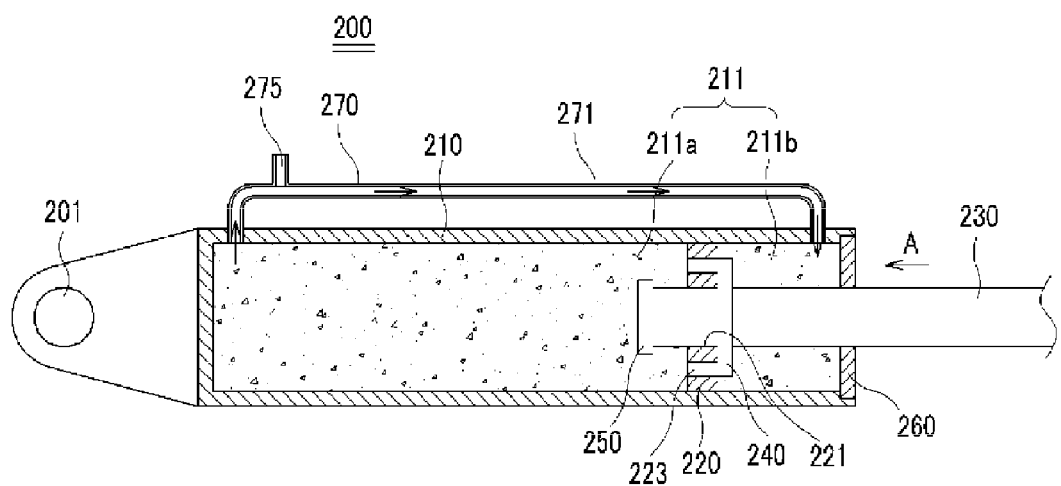
FIG. 11 is a cross-sectional view for describing a hydraulic operation of an integral buffering apparatus for automatically controlling a flow rate of a fluid, when the end wall illustrated in FIG. 2 is folded, according to another embodiment of the present invention.
Figure 12:
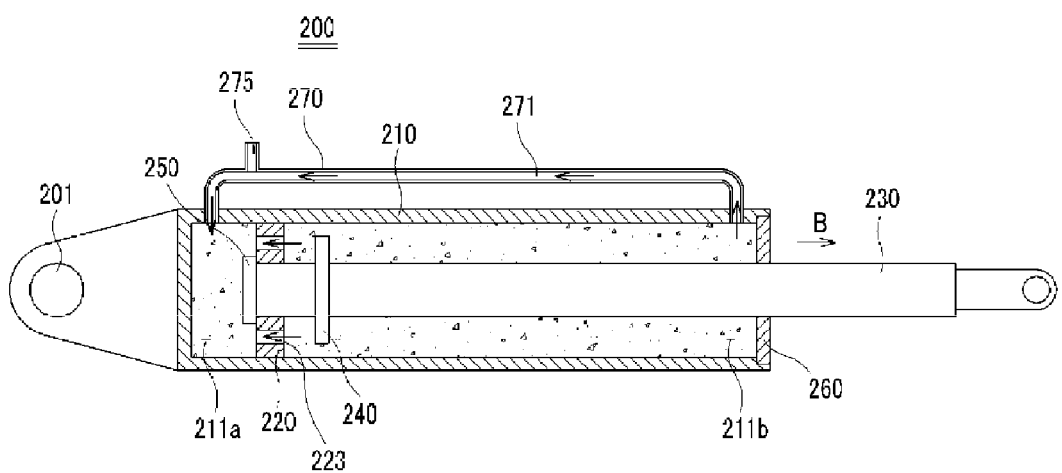
FIG. 12 is a cross-sectional view for describing the hydraulic operation of the integral buffering apparatus illustrated in FIG. 11 when the end wall illustrated in FIG. 2 is unfolded.

FIG. 11 is a cross-sectional view for describing a hydraulic operation of an integral buffering apparatus 200 for automatically controlling a flow rate of a fluid, when the end wall 13 illustrated in FIG. 2 is folded, according to another embodiment of the present invention. FIG. 12 is a cross-sectional view for describing the hydraulic operation of the integral buffering apparatus 200 illustrated in FIG. 11 when the end wall 13 illustrated in FIG. 2 is unfolded. The integral buffering apparatus 200 illustrated in FIGS. 11 and 12 may be installed on the flat rack container 20 illustrated in FIG. 2 and thus will be described in conjunction with FIG. 2.

Referring to FIGS. 11 and 12, the integral buffering apparatus 200 includes a cylinder housing 210 having one end combined with the fixing bracket 22 of the base 11 by using a hinge 201 and including a space 211 for accommodating oil; a slider 220 disposed in the space 211 to divide the space 211 into a first space 211a and a second space 211b, formed to be movable in a length direction of the cylinder housing 210, and including a combining hole 221 formed at the center of the slider 220, and first oil channels 223 formed around the combining hole 221 along a circumference direction of the slider 220; a cylinder rod 230 having one end disposed outside the cylinder housing 210 and connected to the fixing arm 25 of the pivot 14 of the end wall 13, and another end inserted into the space 211 and combined with the slider 220; a pressing plate 240 having a diameter that is sufficient to close the first oil channels 223 when the end wall 13 is folded; a bypass tube 270 formed outside the cylinder housing 210 to connect the first space 211a and the second space 211b to each other, and including a second oil channel 271 having a diameter less than that of the first oil channels 223; a stopper 250 formed at the other end of the cylinder rod 230 to penetrate through the combining hole 221 of the slider 220, and for restricting a moving distance of the slider 220 on the cylinder rod 230; and a cylinder housing cap 260 combined with an open end of the cylinder housing 210 in order to seal the space 211 of the cylinder housing 210.

In the integral buffering apparatus 200, when the end wall 13 is folded, i.e., when the cylinder rod 230 proceeds a direction into the cylinder housing 210 (represented by an arrow A in FIG. 11), the slider 220 moves to a closing position for closing the first oil channels 223 by using the pressing plate 240 and thus the first oil channels 223 are closed by the pressing plate 240. In this case, oil in the first space 211a flows into the second space 211b through the second oil channel 271.

When the end wall 13 is unfolded, i.e., when the cylinder rod 230 proceeds in a direction out of the cylinder housing 210 (represented by an arrow B in FIG. 11), the slider 220 moves to an opening position for opening the first oil channels 223 and thus the first oil channels 223 are open. In this case, the oil in the second space 211b flows into the first space 211a through the first oil channels 223 and the second oil channel 271.

The bypass tube 270 is connected to a flow rate controlling valve 275 that may be exposed to an outer side of the base 11.

The flow rate controlling valve 275 may control the flow rate of the oil that flows through the bypass tube 270 so as to control a falling speed of the end wall 13 as desired.

Operation of the integral buffering apparatus 200 will now be described.

Referring to FIG. 3, the end wall 13 represented by solid lines is completely unfolded. When the end wall 13 is completely unfolded, the center of gravity CP of the end wall 13 is at the outer side of the virtual line S and thus the end wall 13 may be maintained in the unfolded state as long as an external force is not applied.

In order to fold the end wall 13, a worker pushes the end wall 13 to slightly rotate the end wall 13 about the pivot 14 in a counterclockwise direction. As represented by dashed dotted lines in FIG. 3, if the end wall 13 is rotated until the center of gravity CP is at an inner side of the virtual line S, the end wall 13 and the fixing arm 25 fixed to the pivot 14 move to a position capable of folding the end wall 13 due to a self-weight of the end wall 13. In this process, the slider 220 moves on the cylinder rod 230 from the opening position to the closing position, and thus a worker may easily push the end wall 13 without receiving a resistive force of hydraulic pressure applied to the slider 220.

After that, even if a worker does not further push to rotate the end wall 13, the end wall 13 continues to rotate about the pivot 14 to be folded due to the self-weight of the end wall 13, and the fixing arm 25 fixed to the pivot 14 rotates about the pivot 14 in the counterclockwise direction. In this case, the cylinder rod 230 combined with the fixing arm 25 by using the pin P starts to be compressed in the direction into the cylinder housing 210 (represented by the arrow A in FIG. 11).

As illustrated in FIG. 11, if the cylinder rod 230 is compressed in the direction into the cylinder housing 210 (represented by the arrow A in FIG. 11), the pressing plate 240 closes the first oil channels 223 of the slider 220 within a predetermined period of time. Here, the cylinder rod 230 is continuously compressed into the cylinder housing 210 due to the rotation of the end wall 13, and thus the oil in the first space 211a does not pass through the first oil channels 223 and flows into the second space 211b through the second oil channel 271. In this case, since the oil in the first space 211a flows into the second space 211b through the second oil channel 271, which allows a relatively low flow rate in comparison to the first oil channels 223, the resistive force of hydraulic pressure occurs, the cylinder rod 230 moves slowly, and thus the end wall 13 falls slowly.

Due to the above-described hydraulic operation, when the end wall 13 is folded, as an impact of the end wall 13 is absorbed by controlling a falling speed of the end wall 13, damage of the base 11 and the end wall 13 may be prevented and a safety accident involving a worker when the end wall 13 falls rapidly may be effectively prevented in advance.

On the other hand, when the end wall 13 is unfolded, as illustrated in FIG. 12, the cylinder rod 230 is pulled in the direction out of the cylinder housing 210 (represented by the arrow B in FIG. 12), the slider 220 moves on the cylinder rod 230 from the closing position to the opening position, and thus the first oil channels 223 closed by the pressing plate 240 are open.

Here, the cylinder rod 230 is continuously pulled out of the cylinder housing 210 due to the rotation of the end wall 13, and thus the oil in the second space 211b passes through the first oil channels 223 and the second oil channel 271 and flows into the first space 211a. In this case, since the oil in the second space 211b flows into the first space 211a through the second oil channel 271 and the first oil channels 223, which allow a relatively high flow rate in comparison to the second oil channel 271, the cylinder rod 230 may easily proceed backward without receiving a large resistive force and thus a worker may easily lift and unfold the end wall 13. In particular, if the end wall 13 is lifted by using a forklift, the oil rapidly flows through the open first oil channels 223 and the second oil channel 271 and thus components in the cylinder housing 210 are not damaged due to hydraulic pressure.

As described above, according to the present invention, as an integral buffering apparatus for automatically controlling a flow rate of a fluid is adopted, an impact of end walls may be absorbed and damage of the end walls and a base may be prevented by controlling a falling speed of the end walls when the end walls are folded.

Also, as the impact of the end walls is absorbed by controlling the falling speed of the end walls when the end walls are folded, a safety accident involving a worker when the end walls fall rapidly may be prevented in advance.

Furthermore, since the integral buffering apparatus is simply structured and easily operated, and is disposed at an inner side of the base and is not exposed to an outer side of the base unlike a conventional counter balancing spring, the integral buffering apparatus may be effectively protected from an external impact.

While the present invention has been particularly shown and described with reference to exemplary embodiments thereof, it will be understood by those of ordinary skill in the art that various changes in form and details may be made therein without departing from the spirit and scope of the present invention as defined by the following claims. For example, although the above embodiments of the present invention are described on the assumption that one cylinder housing is assembled to one cylinder rod, a plurality of cylinder housings may each be connected to one cylinder rod in series or in parallel.

What is claimed is:

1. A flat rack container comprising:
   a base for loading goods;
   an end wall rotatably combined at each of two ends of the base by using a pivot; and
   an integral buffering apparatus for automatically controlling a flow rate of a fluid, the integral buffering apparatus comprising:
      a cylinder housing comprising a space for accommodating oil;
      a slider disposed in the space to be movable in a length direction of the cylinder housing and to divide the space into a first space and a second space;
      first oil channels and a second oil channel for connecting the first space and the second space to each other;
      a cylinder rod having a first end disposed outside the cylinder housing and a second end inserted into the space and combined with the slider; and
      a cylinder housing cap combined with the cylinder housing in order to seal the space of the cylinder housing,
      wherein, when the cylinder rod moves in one direction, the first oil channels are closed and the oil in the first space flows into the second space through the second oil channel, and wherein, when the cylinder rod moves in another direction, the first oil channels are open and the oil in the second space flows into the first space through the first oil channels and the second oil channel, wherein, in the integral buffering apparatus, one of the cylinder rod and the cylinder housing is combined with the base and the other of the cylinder rod and the cylinder housing is combined with the end wall in such a way that the cylinder rod moves in one direction when the end wall is folded, and moves in another direction when the end wall is unfolded.

2. The flat rack container of claim 1, further comprising: a fixing bracket combined with the base; and a fixing arm fixed to the pivot of the end wall, wherein one of the cylinder rod and the cylinder housing is combined with the fixing bracket by using a hinge, and the other of the cylinder rod and the cylinder housing is connected to the fixing arm.

3. The flat rack container of claim 1, wherein, when the end wall is completely unfolded, a center of gravity of the end wall is at an outer side of a virtual line that extends perpendicularly from a center of rotation of the end wall and thus the end wall is maintained in the unfolded state as long as an external force is not applied.

4. The integral buffering apparatus of claim 1, further comprising a pressing plate disposed at the second end of the cylinder rod and for closing the first oil channels, wherein the first oil channels and the second oil channel are formed in the slider, and wherein the slider is combined with the cylinder rod to be movable on the cylinder rod between a closing position for closing the first oil channels by using the pressing plate and an opening position for opening the first oil channels.

5. The integral buffering apparatus of claim 1, further comprising a stopper separated from the pressing plate by a predetermined distance, formed at the second end of the cylinder rod, and for restricting a moving distance of the slider on the cylinder rod.

6. An integral buffering apparatus for automatically controlling a flow rate of a fluid, the integral buffering apparatus comprising:

a cylinder housing comprising a space for accommodating oil;

a slider disposed in the space to be movable in a length direction of the cylinder housing and to divide the space into a first space and a second space;

first oil channels and a second oil channel for connecting the first space and the second space to each other;

a cylinder rod having a first end disposed outside the cylinder housing and a second end inserted into the space and combined with the slider; and a cylinder housing cap combined with the cylinder housing in order to seal the space of the cylinder housing, wherein, when the cylinder rod moves in one direction, the first oil channels are closed and the oil in the first space flows into the second space through the second oil channel, and wherein, when the cylinder rod moves in another direction, the first oil channels are open and the oil in the second space flows into the first space through the first oil channels and the second oil channel;

a pressing plate disposed at the second end of the cylinder rod and for closing the first oil channels, wherein the first oil channels and the second oil channel are formed in the slider, and wherein the slider is combined with the cylinder rod to be movable on the cylinder rod between a closing position for closing the first oil channels by using the pressing plate and an opening position for opening the first oil channels, wherein the cylinder rod, the pressing plate, and the stopper are integrally formed, wherein the slider is divided into two body pieces, and wherein a combining recess and a combining protrusion are respectively formed at two ends of each of the body pieces.

* * * * *